(12) United States Patent
Kass et al.

(10) Patent No.: US 7,483,030 B2
(45) Date of Patent: Jan. 27, 2009

(54) INTERACTIVE SPACETIME CONSTRAINTS: WIGGLY SPLINES

(75) Inventors: Michael Kass, Berkeley, CA (US); John Anderson, San Anselmo, CA (US)

(73) Assignee: Pixar, Emeryville, CA (US)

( * ) Notice: Subject to any disclaimer, the term of this patent is extended or adjusted under 35 U.S.C. 154(b) by 385 days.

(21) Appl. No.: 11/342,264

(22) Filed: Jan. 26, 2006

(65) Prior Publication Data

US 2006/0192783 A1   Aug. 31, 2006

Related U.S. Application Data

(60) Provisional application No. 60/647,665, filed on Jan. 26, 2005.

(51) Int. Cl.
*G06T 13/00* (2006.01)
(52) U.S. Cl. ..................................... 345/473
(58) Field of Classification Search ............... 345/473, 345/959
See application file for complete search history.

(56) References Cited

U.S. PATENT DOCUMENTS

| | | | | |
|---|---|---|---|---|
| 5,305,645 | A * | 4/1994 | Reifsnider et al. | 73/808 |
| 6,154,221 | A * | 11/2000 | Gangnet | 345/442 |
| 6,208,374 | B1 * | 3/2001 | Clinch | 348/79 |
| 6,714,201 | B1 * | 3/2004 | Grinstein et al. | 345/474 |
| 2005/0231512 | A1 * | 10/2005 | Niles et al. | 345/473 |
| 2005/0253849 | A1 | 11/2005 | Reddy et al. | |
| 2008/0061949 | A1 * | 3/2008 | Ferguson et al. | 340/407.1 |

OTHER PUBLICATIONS

Litwinowicz, Peter C. Inkwell: A 2½-D Animation System Computer Graphics, vol. 25, No. 4, Jul. 1991, pp. 113-122.*
Pentland, et al. Good Vibrations: Modal Dynamics for Graphics and Animation Computer Graphics, vol. 23, No. 3, Jul. 1989.*
Witkin, et al., Spacetime Constraints Computer Graphics, vol. 22, No. 4, Aug. 1988 pp. 159-168.*
Michael F. Cohen, Interactive Spacetime Control Animation Computer Graphics vol. 26, No. 2, Jul. 1992 pp. 293-302.*
Oppenheim, et al ("Signals & Systems (Second Edition)" Oppenheim, et al. 1996, Prentice Hall ISBN 0-13-814757-4).*
Ruff, et al Softimage 3D Design Guide 1993, The Coriolis Group, Inc. ISBN 1-57610-147-9) pp. 151-158.*
Cohen, "Interactive spacetime control for animation," *SIGGRAPH 1992, Computer Graphics*, 26(2): 293-302, Jul. 1992.

(Continued)

*Primary Examiner*—Ulka Chauhan
*Assistant Examiner*—Edward T La Barr
(74) *Attorney, Agent, or Firm*—Townsend and Townsend and Crew LLP (57) ABSTRACT

Animation techniques for producing physically-realistic animation while providing the interactivity and control desired by animators. Techniques are provided specifying animation for motion problems that give rise to quadratic optimization functions solvable with linear systems of equations. The resultant splines generalize traditional splines to encompass oscillatory solutions. These problems can be solved at full frame rates, giving animators a keyframe animation tool. Such a formulation is able to address a wide range of oscillatory phenomena while retaining the interactive performance and predictability of traditional splines. The splines may be complex-valued.

39 Claims, 6 Drawing Sheets

OTHER PUBLICATIONS

Fang et al., "Efficient Synthesis of Physically Valid Human Motion," *SIGGRAPH 2003*, pp. 417-426.

Gleicher, "Motion Editing with Spacetime Constraint" in *Proceedings of the 1997 Symposium on Interactive 3D Graphics*, pp. 139-148.

Lasseter, "Principles of Traditional Animation Applied to 3D Computer Animation," *SIGGRAPH 1987, Computer Graphics*, 21(4): 35-44, Jul. 1987.

Liu et al., "Hierarchical Spacetime Control," *SIGGRAPH 1994*, pp. 35-42.

Ngo et al., "Spacetime Contraints Revisited," *SIGGRAPH 1993*, pp. 343-350.

Popovic et al., "Interactive Manipulation of Rigid Body Simulations," *SIGGRAPH 2000*, pp. 209-218.

Popovic et al., "Physically Based Motion Transfonnation," *SIGGRAPH 1999*, pp. 11-20.

Ramamoorthi et al., "Dynamic splines with constraints for animation," Tech. Rep. CS-TR-97-03, Dept. of Computer Science, CalTech, 1997, pp. 1-13.

Rose et al., "Efficient Generation of Motion Transitions Using Spacetime Constraints," *SIGGRAPH 1996*, pp. 147-154.

Safonova et al., "Synthesizing Physically Realistic Human Motion in Low-Dimensional, Behavior-Specific Spaces", *SIGGRAPH 2004*, pp. 514-521.

Treuille et al., "Keyframe Control of Smoke Simulations," *SIGGRAPH 2003*, pp. 716-723.

Witkin et al., "Motion Warping," *SIGGRAPH 1995* pp. 105-108.

Witkin et al., "Spacetime Constraints," *SIGGRAPH 1988*, pp. 159-168.

Goldstein, *Classical Mechanics*, Second Edition, Addison Wesley, 1980, chapter 6, p. 243-263.

Cohen, "Interactive Spacetime Control for Animation," Computer Graphics, 26, 2, Jul. 2, 1992, pp. 293-302.

Litwinowicz, "Inkwell: A 2½-D Animation System," Computer Graphics, vol. 25, No. 4, Jul. 1991, pp. 113-122.

Oppenheim, et al., "Signals & Systems," 2nd Ed., 1996, Prentice Hall ISBN 0-13-814757-4, p. 71.

Pentland, et al., "Good Vibrations: Modal Dynamics for Graphics and Animation," Computer Graphics, vol. 23, No. 3, Jul. 3, 1989, pp. 1989, pp. 215-222.

Ruff, et al., "Softimage 3D Design Guide." The Coriolis Group, Inc., ISBN 1-57610-147-9, pp. 150-158.

Witkin, et al., "Spacetime Constraints," Computer Graphics, vol. 22, No. 4, Aug. 1988, pp. 159-168.

International Search Report PCT/US06/03102.

\* cited by examiner

INTERACTIVE SPACETIME CONSTRAINTS: WIGGLY SPLINES

CROSS-REFERENCES TO RELATED APPLICATIONS

The present application is a non-provisional of and claims benefit under 35 U.S.C. 119(e) of U.S. Provisional Application No. 60/647,665 filed Jan. 26, 2005 titled "INTERACTIVE SPACETIME CONSTRAINTS: WIGGLY SPLINES", the entire contents of which are herein incorporated by reference for all purposes.

BACKGROUND OF THE INVENTION

The present invention relates to the field of computer graphics animation, and more specifically to techniques for specifying animation using splines whose values are calculated using a set of linear equations.

In traditional computer graphics animation, the motion of an object or character in a scene is generally specified by a set of splines or animation curves which describe the way its parameters change over time. The X axis of a spline generally corresponds to time and the Y axis corresponds to the parameter's value as it changes over time. An animator may specify constraints in the form one or more knots and the spline interpolates or approximates the knots.

Use of splines provides excellent control of the motion since the splines simply approximate or interpolate a series of key values or knots carefully crafted by an animator. Traditional splines have thus become very powerful tools in the hands of animators. Unfortunately, traditional spline techniques provide little help to an animator in producing physically realistic motion. This is because the behavior of the splines is only very tenuously related to the underlying physics of motion. For example, splines exhibit perfect time symmetry, while real motion is decidedly asymmetric in time. Accordingly, any physical realism in the motion using traditional splines comes not from the mathematics of the splines themselves, but from the talent, skill, insight and sweat of the animator [Lasseter 1987] (a list of references is provided below before the claims section).

When greater physical realism is desired, or when the required animator time would be too expensive, direct physical simulation of the underlying physics is sometimes used to create computer graphics motion. While physical simulation can create compelling realism of motion, it is often very difficult to control, and simulations can produce surprising or unintended results. Determining the proper applied forces and physical parameters necessary to achieve a particular desired effect is generally a formidable challenge. The central problem in ordinary simulation is that simulation equations march forward in time from initial conditions to a final result. Forces lead to accelerations which are integrated to get velocities and positions over time. If the result at some point in time is not what is desired, it is usually very difficult to determine how the forces and parameters before hand have to be changed to bring the motion closer to the goal.

In 1988, Witkin and Kass [Witkin 1988] developed a technique called Spacetime Constraints to try to marry the physical realism of simulation with the controllability and predictability of traditional splines. Their idea was to have animators continue to specify key values of parameters over time, but interpolate the motion in the most physically realistic way possible subject to these constraints. For example, instead of demanding that Newton's second law, f=ma be satisfied all the time as in a traditional simulation, the Spacetime Constraints formalism minimizes the deviation from the second law while guaranteeing the interpolation constraints set by the animators are met.

Although the Spacetime Constraints approach has the potential to provide the elusive combination of realism, predictability and control sought after in computer graphics production, it has thus far remained the realm of academic research for at least two reasons. Foremost among the difficulties in using Spacetime Constraints is the complexity involved. The full equations of motion for even simple object models are tremendously complicated and required an elaborate symbolic math-based compiler to evaluate. Even if the equations of motion of interesting character models can be managed, a second obstacle is the execution time of the required nonlinear optimization. Animators are loath to use any technique which slows an animation system down from interactive speeds. Full character-level Spacetime Constraint problems cannot presently be solved fast enough with existing formulations.

A variety of researchers have applied the Spacetime Constraints approach to specific domains, used different optimization methods, tried accelerate it, or addressed other weaknesses in the original formulation (e.g., [Cohen 1992], [Ngo 1993], [Liu 1994], [Witkin 1995], [Rose 1996], [Gleicher 1997], [Popovic 1999], [Popovic 2000], [Fang 2003], [Treuille 2003], [Safonova 2004]). Good summaries of the specific contributions and evolution of the ideas can be found in [Fang 2003] and [Safonova 2004]. However, these techniques do not provide the interactivity and control desired by animators.

BRIEF SUMMARY OF THE INVENTION

Embodiments of the present invention provide animation techniques for producing physically-realistic animation while providing the interactivity and control desired by animators.

Techniques are provided specifying animation for motion problems that give rise to quadratic optimization functions solvable with linear systems of equations. The resultant splines generalize traditional splines to encompass oscillatory solutions. These problems can be solved at full frame rates, giving animators a keyframe animation tool. Such a formulation is able to address a wide range of oscillatory phenomena while retaining the interactive performance and predictability of traditional splines. The splines may be complex-valued.

According to an embodiment of the present invention, techniques are provided animating an object. A set of one or more constraints may be received. A set of values are determined for a first parameter associated with the object over a plurality of time points using a set of linear equations, the set of linear equations providing a solution to a function specifying oscillatory motion. An animation curve is generated for the parameter based upon the determined set of values.

In one embodiment, the function may model a mass-spring oscillator. In other embodiments, the function may specify other types of oscillatory motion.

According to an embodiment of the present invention, information may be identifying a set of behavior characteristics, and the set of values determined for the first parameter approximates or interpolates the set of constraints and is based upon the set of behavior characteristics. In one embodiment, the set of constraints may comprise an interpolation constraint and a tangent constraint and the set of behavior characteristics comprises a damping factor and a resonance value. The animation curve for the first parameter may be displayed. The set of constraints may also be displayed.

The animation curve may be used to specify and customize animation for the object. Information may be received indicating a change in at least one constraint in the set of constraints. An animation curve may be generated for the first parameter that interpolates or approximates the changed set of constraints. In one embodiment, the generation of the curve using the changed set of constraints is performed at an interactive rate of 30 frames per second or less.

According to an embodiment of the present invention, the set of values determined for the first parameter comprises at least a first value having a real part and a non-zero imaginary part. In one embodiment, an animation curve is generated for a second parameter associated with the object using the animation curve generated for the first parameter and the non-zero imaginary part.

According to another embodiment of the present invention, techniques are provided for animating an object where an animation curve is generated for a first parameter associated with the object, the animation curve generated based upon a set of values calculated for the first parameter over time, the set of values comprising a first value having a real part and a non-zero imaginary part. The animation curve may be used to control animation of the first parameter. In one embodiment, the non-zero imaginary part identifies a phase angle.

According to an embodiment of the present invention, an animation curve is generated for a second parameter associated with the object using the animation curve generated for the first parameter and the non-zero imaginary part. In one embodiment, the non-zero imaginary part indicates a phase value, and the animation curve for the second parameter is phase-shifted from the animation curve for the first parameter by the phase value. In one embodiment, the non-zero imaginary part indicates a phase value, and motion of the second parameter is phase-shifted from motion of the first parameter.

According to an embodiment of the present invention, generating the animation curve for the first parameter comprises determining a set values for the first parameter over a plurality of time points using a set of linear equations, the set of linear equations providing a solution to a function specifying motion. The function may represent oscillatory motion. The function may model a mass-spring oscillator.

Information may be received identifying a set of behavior characteristics and a set of constraints. Generating the animation curve for the first parameter may comprise generating an animation curve that approximates or interpolates the set of constraints and is based upon the set of behavior characteristics. In one embodiment, the set of constraints comprises an interpolation constraint and a tangent constraint and the set of behavior characteristics comprises a damping factor and a resonance value.

The animation curve for the first parameter and a representation of the set of constraints may be displayed and used for specifying animation. Information may be received indicating a change in at least one constraint in the set of constraints. A new animation curve may be generated for the first parameter that interpolates or approximates the changed set of constraints. In one embodiment, the generation of the new curve may be performed at an interactive rate of 30 frames per second or less.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention provide animation techniques for producing physically-realistic animation while providing the interactivity and control desired by animators.

As previously stated, Spacetime Constraints formulation attempts to marry the realism of physical simulation with the controllability of keyframe animation, but the resulting non-linear optimization problems are generally extremely complex and slow to solve. Instead, embodiments of the present invention explore the range of Spacetime Constraints problems that give rise to quadratic optimization functions solvable with linear systems of equations. The resultant splines generalize traditional splines to encompass oscillatory solutions. These problems can be solved at full frame rates, giving animators a keyframe animation tool with built in knowledge of some simple physics.

Instead of looking at an optimization expression which will capture the full physics of the underlying problem and which results in nonlinear solutions as with traditional Spacetime Constraint solutions, embodiments of the present invention choose to examine how far one can go using only optimizations that can be computed rapidly enough to be used in place of traditional splines. Embodiments of the present invention use formulations that give rise to simultaneous linear equations. Such a formulation is able to address a wide range of oscillatory phenomena while retaining the interactive performance and predictability of traditional splines. Since the solutions arise from linear or linearized Spacetime Constraints problems, they are referred to as "Linear Spacetime Constraint Splines" (LSC splines), or even "Wiggly Splines" because of their penchant for oscillation.

In the Spacetime Constraints formalism, an animator begins with a physical system, adds constraints, and then, subject to these constraints, an objective function is minimized which penalizes non-physical and inefficient motion. Let us first consider passive systems where efficiency is not an issue. In this case, the objective function will simply be a measure of the departure of the motion from passive physics.

A physically accurate simulation will follow Newton's second law of motion: f=ma. Consider the simple example of a point mass moving in one dimension with position given by x(t). It is expected that acceleration a=$\ddot{x}$ to be equal to the known force f divided by the mass m. If the mass point is observed as accelerating in a way inconsistent with the known forces, then the observed motion may be explained by positing a mysterious "jet engine force" j(t) acting on the mass. The most physically realistic motion will be one where the jet engine forces are as small as possible.

$$f+j=ma=m\ddot{x} \quad \text{Equation (1)}$$

$$j=m\ddot{x}-f \quad \text{Equation (2)}$$

Without loss of generality, units may be chosen such that m=1, and then equation (2) becomes $$j=\ddot{x}-f \quad \text{Equation (3)}$$

In order to minimize the force of the jet engine, a norm is needed to rank different possible jet engine functions j(t), so we can choose among different possible paths of motion x(t). There are a variety of choices here including penalizing the average power output of the jet engine or the amount of work it puts out, but in order to keep the optimization problem linear, the teaching of [Witkin 1988] is followed to minimize the $L^2$ norm of the force.

$$E=\int j^2 dt \quad \text{Equation (4)}$$

If E=0, then j must be uniformly zero, and the motion is completely physical with no jet engine force at all.

In general, animators will be concerned with situations where the known applied force f is a linear combination of the motion x and its derivatives, but for the moment, consider what happens when the known applied force f is zero. Then the jet engine force in equation (3) becomes j=$\ddot{x}$ and the function to be minimized is:

$$E=\int \ddot{x}^2 dt \quad \text{Equation (5)}$$

Equation (5) is the minimum principle from which traditional cubic interpolatory splines are derived [Bartels 1987]. It is well known and easy to prove using calculus of variation that the minimization of equation (5) gives rise to piecewise cubic polynomial solutions, and these are widely used throughout computer graphics. Generalizing the continuous solution to situations where the applied force f is a linear differential operator on x, however, would lead to piecewise exponentials.

The motivation in computing the minimum is to construct animation curves or splines. Typically, splines or animation curves need only be evaluated at discrete integer frame times and perhaps shutter-close times for motion blur. True geometric continuity is generally not required. As a result, it is easier to express the minimization problem in the discrete domain and solve it there, although there may be applications for which the true piecewise continuous exponential solution may be preferable.

Discretizing equation (5) with standard finite differences leads to the following function to be minimized:

$$E_s = \left(\frac{1}{h}\right)^2 \sum_{i=1}^{n} (x_{i-1} - 2x_i + x_{i+1})^2 \quad \text{Equation (6)}$$

where h is the time separation between samples. The minimum will occur when the gradient vanishes $$\frac{\partial E_s}{\partial x_i} = 0 \quad \text{Equation (7)}$$

For each i away from the boundaries, three terms of the sum in equation (6) lead to non-zero derivatives, and they combine so that equation (7) leads to a banded linear system with bandwidth 5. Equations of this form can be solved using standard techniques [Golub 1983] [Press 1986] in time proportional to n, the number of samples of $x_i$.

Constraints

Constraints may be added to equation (7). The primary constraint is the ability to set a particular value at a particular time—an interpolation constraint. Setting up interpolation constraints with the finite difference formalism is not at all difficult. Suppose a constraint is to be established such that $x_j$=v for some j. This is done by dropping $x_j$ from equation (6) and replacing it with the constant value v. The resulting linear system will have one fewer equation.

In addition to setting interpolation constraints, animators may also establish tangent constraints. This may be done in the finite difference formulation. Let g be the desired tangent at sample i. Then, a penalty term may be added to the optimization function as follows:

$$E=E_s+E_t \quad \text{Equation (8)}$$

$$E_t=c_t((1/h)(x_{i+1}-x_i)-g)^2 \quad \text{Equation (9)}$$

where $c_t$ is a constant that sets the strength of the tangent penalty.

With just interpolation constraints, the solution of the minimization problem in equation (6) produces a spline with global support. In fact, it converges to the same curve as an interpolating $C^2$ cubic, because it minimizes the same energy. If tangent constraints are introduced at the interpolation constraints, however, the effective support of the spline becomes more and more local as the penalty constant $c_t$ is increased. If $c_t$ is high enough, and if the finite difference sampling is adequate, the global optimization will produce a result indistinguishable from locally supported piecewise cubics such as Bezier or Catmull-Rom splines (depending on the computation used to set the tangent constraints).

Interestingly, when the optimization is done numerically with finite differences, the constant $c_t$ allows an animator to choose on a knot by knot basis whether the animator wants to maximize smoothness by allowing global support, strictly enforce local support, or do something in between. It provides some additional freedom difficult to achieve with the usual analytic spline formulations.

An advantage of the usual analytic splines is that strict local support allows values of the analytic splines in an interval to be calculated from a fixed number of neighboring knots. If the animator is willing to forego this property, the finite difference splines described here still require only constant time per sample to calculate. More importantly, by allowing the applied force to be non-zero, they allow a wide range of interesting new behavior.

Mass-Spring Oscillator

There are several reasons for selecting and using Spacetime Constraint solutions of linear differential equations. First, they very commonly approximate physical situations of interest. Second, they are very tractable, both from the point of view of computing the result, and characterizing the expected behavior.

Linear differential equations arise commonly for physical systems displaced only slightly from equilibrium. Consider any mechanical system whose potential energy is given by a function $V(q_1, \ldots, q_n)$ of some generalized coordinates. Since the displacement is understood to be small, the energy function may be expanded around the equilibrium using a Taylor series. New coordinates $\eta_i$ may be introduced to denote the displacement of the system from its equilibrium position $(q_{01}, \ldots, q_{0n})$.

$$q_i = q_{0i} + \eta_i \qquad \text{Equation (10)}$$

Potential energy functions have an arbitrary zero, so without loss of generality, the zero may be shifted to coincide with the equilibrium position $Q_0$, making the first term of the Taylor series vanish. The second term will also vanish because the gradient is zero at the equilibrium. As a consequence, the first non-zero term of the expansion will be due to the second derivatives of the energy.

$$V(q_1, \ldots, q_n) \approx \frac{1}{2} \sum_{i,j} \left( \frac{\partial^2 V}{\partial q_i \partial q_j} \right)_{q_0} \eta_i \eta_j \qquad \text{Equation (11)}$$

Quadratic energies such as these imply linear forces since $f = -\nabla E$. The resulting systems will exhibit oscillatory solutions [Goldstein 1980]. If a switch is made from using the $\eta_i$ to normal coordinates (see [Goldstein 1980] for details—in simple cases the normal coordinates are just the eigenvectors of $\partial^2 V/\partial q_i \partial q_j$), then the resulting equations correspond to the motion of damped springs in each of the normal coordinates.

The fact that any physical system, displaced slightly from equilibrium and viewed in the proper coordinate system, will exhibit the passive physics of a damped spring suggests that this type of behavior is fundamental and universal and that animators would benefit from incorporating it into animation interpolation or approximation schemes.

There is an additional reason for considering the damped spring model to be fundamental in animation. While there are certainly important nonlinearities in muscle behavior, the linear "Active State Muscle Model" [McMahon 1984] has been a very effective reference for the mechanical properties of muscles. Essentially, it consists of a set of linear elements which create a movable equilibrium with an adjustable tension around that equilibrium. The passive behavior of such a system is given by a damped spring oscillator forced by a changing equilibrium.

Returning to the Spacetime Constraints problem of equations (3) and (4), but introducing the physical model of a damped spring, then the applied force, instead of dropping out, becomes key to the behavior of the system. In a standard damped spring, the applied force is given by:

$$f = -kx - \gamma \dot{x} \qquad \text{Equation (12)}$$

Plugging this expression for the force into equation (4) yields the optimization function $$E = \int (\ddot{x} + \gamma \dot{x} + kx)^2 dt \qquad \text{Equation (13)}$$

Proceeding as before by substituting finite differences for the derivatives, equation (13) becomes $$E_s = \frac{1}{h^2} \sum_{i=1}^{n} (m(x_{i-1} - 2x_i + x_{i+1}) + h\gamma(x_{i+1} - x_i) + h^2 x_i)^2 \qquad \text{Equation (14)}$$

While this expression is more complicated than the case of the ordinary spline, it is still a quadratic objective function. As a result, equation (14) once again gives rise to a banded set of simultaneous linear equations with a bandwidth of five.

According to an embodiment of the present invention, the solution to equation (14) is programmed into a traditional spline editor, using the original interface for interpolation and tangent constraints to modify the optimization problem as described above. Values for the LSC spline are calculated using the set of linear equations and splines or animation curves drawn based upon the calculated values. According to an embodiment of the present invention, true interactive speeds of 30 fps update rates are achieved using a personal computer and the LSC spline computation takes less execution time than the time required to draw the result. Accordingly, the LSC splines provide the interactivity and control desired by animators.

Figure 1:
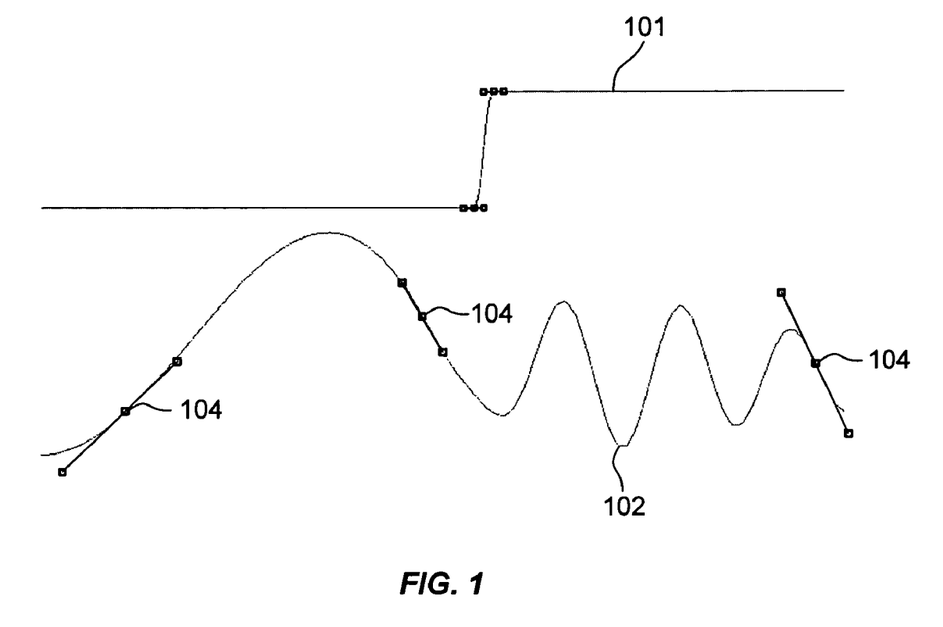
FIG. 1 shows an example of an LSC spline being used according to an embodiment of the present invention.

FIG. 1 shows an example of an LSC spline being used according to an embodiment of the present invention. As depicted in FIG. 1, the upper curve 101 is a traditional spline used to control the spring constant. The resonance begins at zero and then changes abruptly to a non-zero value. The lower curve 102 is a Linear Spacetime Spline according to the teachings of the present invention. The lower curve has three interpolation and tangent constraints 104. On the left side of FIG. 1, the spring constant and damping are zero, so the bottom curve 102 behaves like a familiar piecewise cubic spline. In the middle, the upper curve 101, representing the spring constant, abruptly increases and shifts the resonance. As a consequence, on the right side, the curve 102 oscillates between the second and third interpolation constraints. It should be note that curve 102 has a series of inflection points between the second and third constraints, and is clearly not representable on that span as a single cubic.

Digital Signal Processing View

The continuous differential equation that results from equation (12) when $j=0$ is stable for all positive values of $k$ and $\gamma$. However, once finite differences are substituted for continuous derivatives, stability may no longer be guaranteed. In order to guarantee stability, the equations may be recast in terms of digital signal processing.

Going back to equation (12) and substituting in finite differences for the derivatives yields $$f_i = -kx_i - \gamma x_{i+1} - x_i \qquad \text{Equation (15)}$$

Combining this with equation (3) and using a finite difference for $\ddot{x}$ gives $$x_{i+1} - ax_i - bx_{i-1} = j \qquad \text{Equation (16)}$$

where a and b are functions of the spring constant $k$ and the damping constant $\gamma$. In the language of Digital Signal Processing, equation (16) represents a second order recursive (IIR) filter where the input of the filter is the jet engine force computed by the optimization. The objective function may now be rewritten in terms of a and b, and then IIR filter design techniques may be used to set a and b to values that guarantee stability. The rewritten objective function is $$E_S = \sum_{i=1}^{n} (x_{i+1} - ax_i - bx_{i-1})^2 \qquad \text{Equation (17)}$$

The response of the filter in equation (16) to the jet engine forcing is fully characterized by the system function of the filter, which is given by [Oppenheim 1975]

$$H(z) = \frac{1}{1 - az^{-1} - bz^{-2}} \qquad \text{Equation (18)}$$

When evaluated on the unit circle, the system function gives the frequency response of the filter. If the system function is factored, then two roots are found of the denominator polynomial $$H(z) = \frac{1}{(1 - \lambda_0 z^{-1})(1 - \lambda_1 z^{-1})} \qquad \text{Equation (19)}$$

These roots $\lambda_0$ and $\lambda_1$ are known as the poles of the filter and they provide the information required to control the frequency response and the stability of the filter. If both poles are inside the unit circle, the filter will be stable.

In practice, the system is generally designed by choosing the poles to have the desired resonance and damping. Then, a and b may be computed from $\lambda_0$ and $\lambda_1$ using the expressions:

$$a = \lambda_0 + \lambda_1 \qquad \text{Equation (20)}$$

$$b = -\lambda_0 \lambda_1 \qquad \text{Equation (21)}$$

In order for a and b to be real, the poles must either be real, resulting in a purely damped solution with no oscillation, or must be complex conjugates.

Accordingly, digital signal processing allows embodiments of the present invention to express stability criteria and describe the resonances of linear Spacetime Constraints problems with ease.

Complex-Valued Spline or Animation Curve

Although the Spacetime Constraints mass-spring oscillator dutifully interpolates or approximates positional and tangent constraints, it may be difficult to coax into a desired curve in certain situations. This is because the resonance of the oscillator may be very sharp. As a result, the LSC spline may be over-eager to oscillate at precisely the resonant frequency. If the constraints are moved in time so that all the time intervals are increased in size by a small percentage, then instead of the solution stretching slightly, the frequency of oscillation will remain unchanged, and the LSC spline will manage to satisfy the constraints by adding an additional low-frequency component.

In a general Spacetime Constraints setting, the resonant frequency may be allowed to be a parameter of the optimization, so altering the timing of the constraints would tend to change the frequency of oscillation. However, the obvious ways of allowing the resonant frequency to be computed by the optimization result in strongly nonlinear Spacetime Constraints problems. Within the domain of linear Spacetime Constraints problems, the way to mitigate this effect is to widen the resonance of the linear filter, turning it into as close to an ideal bandpass filter as possible with the passband centered around a frequency chosen by the animator.

Figure 2:
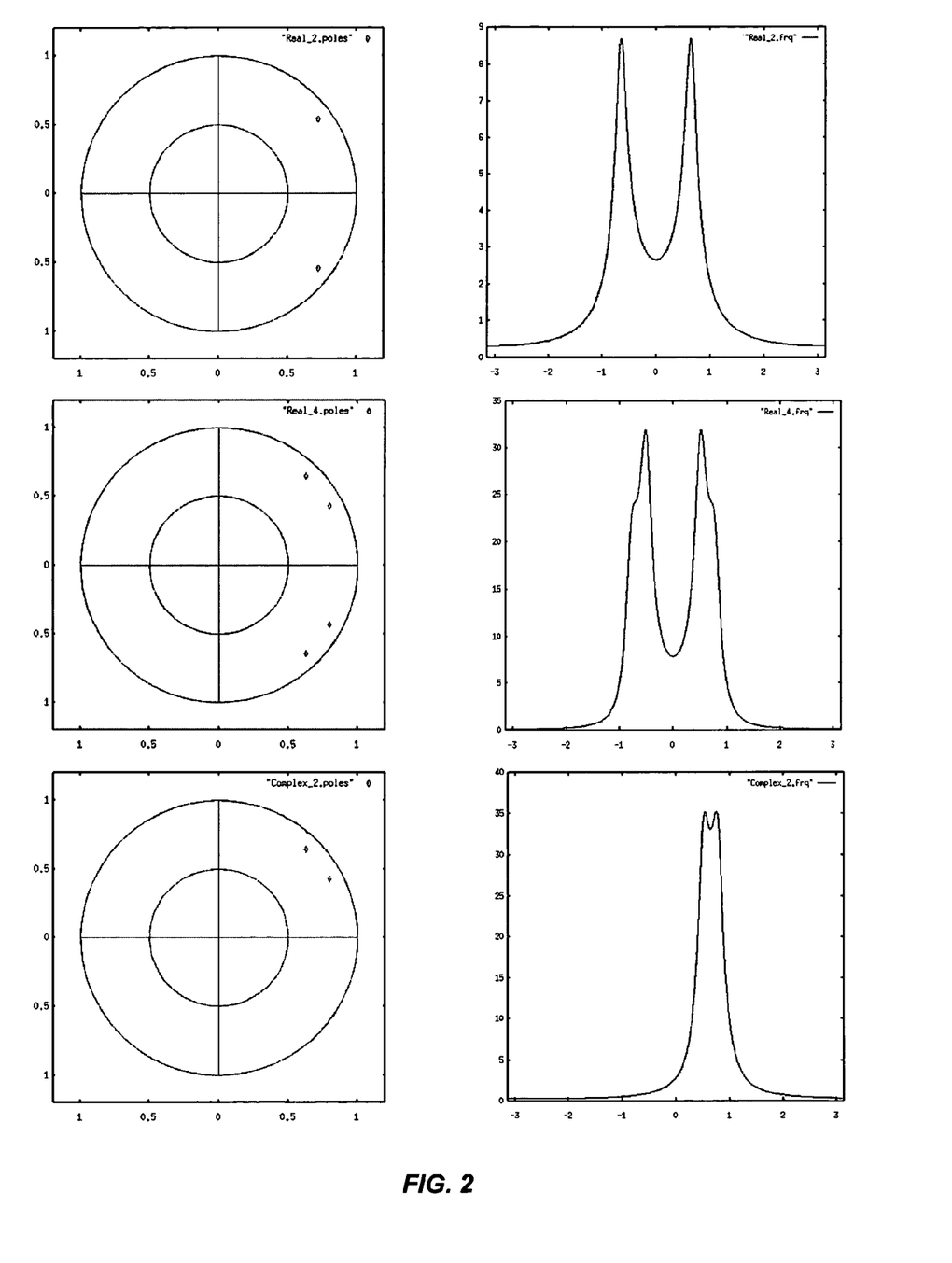
FIG. 2 depicts various pole locations and corresponding frequency responses.

The second order mass-spring system provides limited degrees of freedom for shaping the frequency response because the two poles are required to be complex conjugates in order to ensure that the filter coefficients are real. FIG. 2 depicts various pole locations and corresponding frequency responses. The top of FIG. 2 shows a representative sample pair of conjugate pole locations, and the corresponding of the frequency response. It is noticeable that the resonance is very sharp. At the same time, there is significant response at zero frequency where the influence of the two conjugate poles interact.

The usual way to gain additional degrees of freedom to shape the frequency response of a filter is to make it higher order, for example, by adding poles. The middle row of FIG. 2 shows a representative example of what can be accomplished with this technique. It shows a fourth-order filter with pairs of poles centered around the previous poles and exhibits the resulting frequency response. The resonance has been broadened, but the response at zero frequency is still unacceptably high.

An alternative solution to the problem is to allow the filter coefficients to be complex. Then the poles need not be conjugate, and a very different frequency response results. The bottom row of FIG. 2 shows a representative example of this technique according to an embodiment of the present invention. The pass band has been widened while keeping the response at zero frequency much lower.

In principle, it is possible to achieve the same result with a fourth-order real filter as the second-order complex filter, if you can avoid exciting the oscillatory modes represented by the conjugate poles. In practice, this can be quite difficult, particularly in the optimization setting, where constraints may be specified at arbitrary times. As a consequence, the kind of behavior that is sought may be more easily achieved with a complex-valued spline than with a real one.

The computation of the complex-valued spline (i.e., a spline having at least one value with a real part and a non-zero imaginary part) begins just as before. For example, the animator may select the resonant frequency and degree of damping desired, which together determine a point on the complex plane. The complex poles $\lambda_0$ and $\lambda_1$ may then be generated by rotating the point clockwise and counterclockwise by an amount that determines the bandwidth of the filter. From $\lambda_0$ and $\lambda_1$, the coefficients a and b of the recursive filter may be computed. This time, however, the coefficients a and b and the resulting spline will all be complex. Accordingly, the new objective function is $$E_S = \sum_{i=1}^{n} |x_{i+1} - ax_i - bx_{i-1}|^2 \qquad \text{Equation (22)}$$

where the sum of squares in equation (17) has been replaced with a sum of squared complex magnitudes. The number of degrees of freedom in the optimization has been doubled, since each value of x has both a real part and an imaginary part. The condition for the minimum is that the partial derivative of the objective function E with respect to both the real part and the imaginary part of each $x_i$ must vanish.

Figure 3:
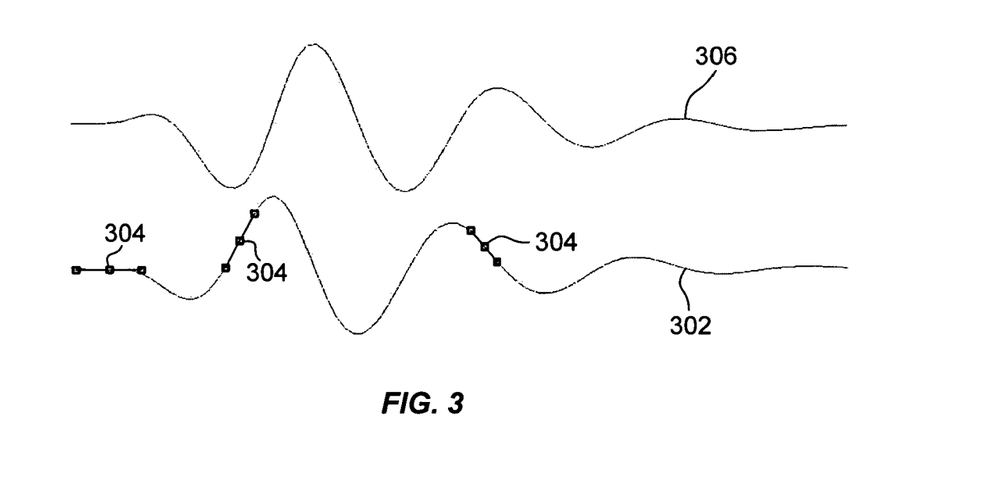
FIG. 3 depicts a complex-valued spline according to an embodiment of the present invention.

FIG. 3 depicts a complex-valued spline according to an embodiment of the present invention. The bottom curve 302 depicts the real part resulting from three interpolation and tangent constraints 304. The top curve 306 is the computed imaginary part.

Figure 4:
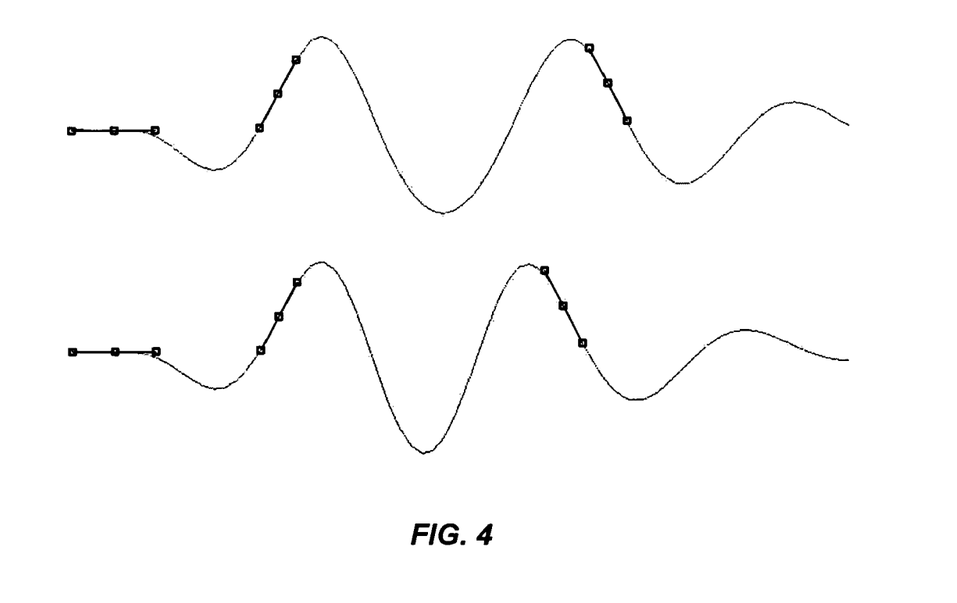
FIG. 4 depicts another complex-valued spline according to an embodiment of the present invention

FIG. 4 shows the real (below) and imaginary (above) parts of a complex-valued LSC spline solution according to an embodiment of the present invention. All the interpolation constraints are applied to the real part, and for most purposes, this is the only part of interest. The existence of the imaginary part, however, does open up some interesting possibilities, as it defines a phase angle for the animation curve. Instead of using the real part of x, the real part of $e^{i\Phi}x$ may be used to create a version of x phase shifted by $\Phi$. One could, for example, control a series of bend angles along the tail of a character with different phase shifts of a single LSC spline, and thereby create controllable propagating waves.

FIG. 4 shows that the widening of the resonance with the complex LSC spline is effective. Moving the third interpolation constraint from its position in the bottom curve to its position in the top curve causes the curve to stretch as expected, instead of finding some other, less intuitive, way of meeting the constraints.

Accordingly, the resonance of LSC splines may be broadened by using a complex-valued solution. This not only makes the physically-meaningful real part of the animation curve easier to manipulate, but also provides additional opportunities to use the phase of the animation curve to control additional animation parameters. LSC splines thus provide a complex-valued approximation or interpolation scheme for motion animation.

Accordingly, when the LSC splines are allowed to be complex valued, their solution yields not only the physically meaningful real part, but also an imaginary part, and hence a phase angle. The existence of the phase angle allows a single animation curve for a parameter associated with an object being animated to control a collection of different animation parameters related by different phase lags. The real part and the imaginary part calculated for a time point give a vector in 2D for the time point, where the phase is the angle of the vector. This vector along with the complex number may be multiplied with another vector. In multiplication, the angles add and the lengths multiply. Accordingly, if the vector including the complex part is multiplied with a unit vector, then the result is a different animation result with a phase delay wherein the resultant real part may be used to drive the animation control. Accordingly, based upon an original complex-values spline, a second phase-delayed spline (or animation curve) may be obtained by multiplying the original spline with a unit complex number. In this manner, a family of real splines may be obtained from an original complex-valued spline by multiplying the phases.

External Forcing

In the embodiment described above, it was assumed that the only force on the mass-spring system was due to the passive dynamics. However, in the case of character animation, the animator is generally interested in a combination of passive dynamics along with active muscle action due to intent.

If the equilibrium position of the spring is movable and given by the function y(t), then $$a = \ddot{x} + \ddot{y} \qquad \text{Equation (23)}$$

$$j = \ddot{x} + \ddot{y} - f \qquad \text{Equation (24)}$$

Making this change to j results in the following refinement to equation (22)

$$E_S = \sum_{i=1}^{n} |x_{i+1} - ax_i - bx_{i-1} + \ddot{y}|^2 \qquad \text{Equation (25)}$$

Figure 5:
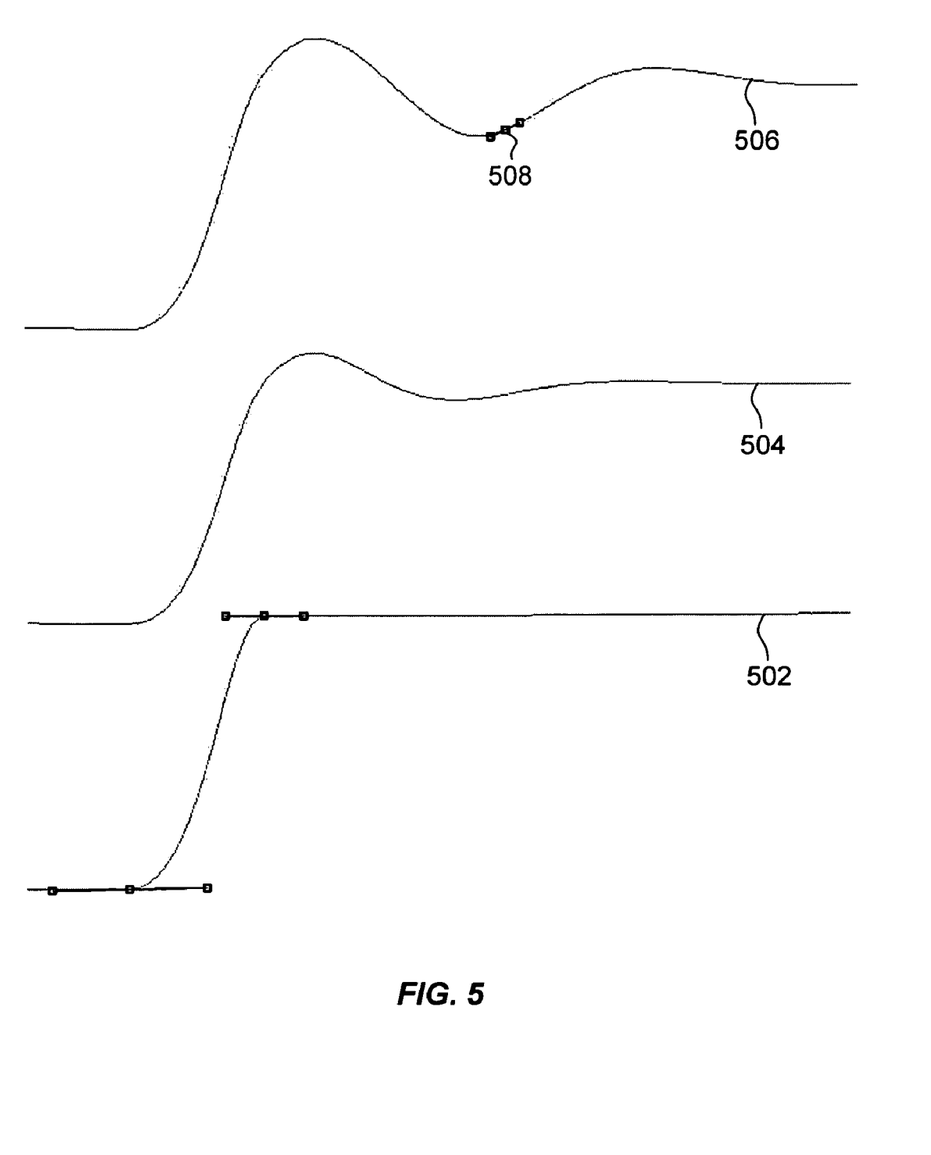
FIG. 5 shows the use of the changing equilibrium position according to an embodiment of the present invention.

FIG. 5 shows the use of the changing equilibrium position according to an embodiment of the present invention. As depicted in FIG. 5, bottom curve 502 shows an animated curve for the function y(t) created with traditional splines. Middle curve 504 shows the LSC solution according to an embodiment of the present invention. No interpolation constraints have been applied to the middle curve, so this represents the pure forward dynamics that could be computed using an ordinary differential equation (ODE). Top curve 506 shows the fundamental difference between the LSC spline and an ODE solution. An interpolation constraint 508 has been added to the middle of the top curve, illustrating that unlike ODE solutions, the LSC spline is editable at any point.

Figure 6:
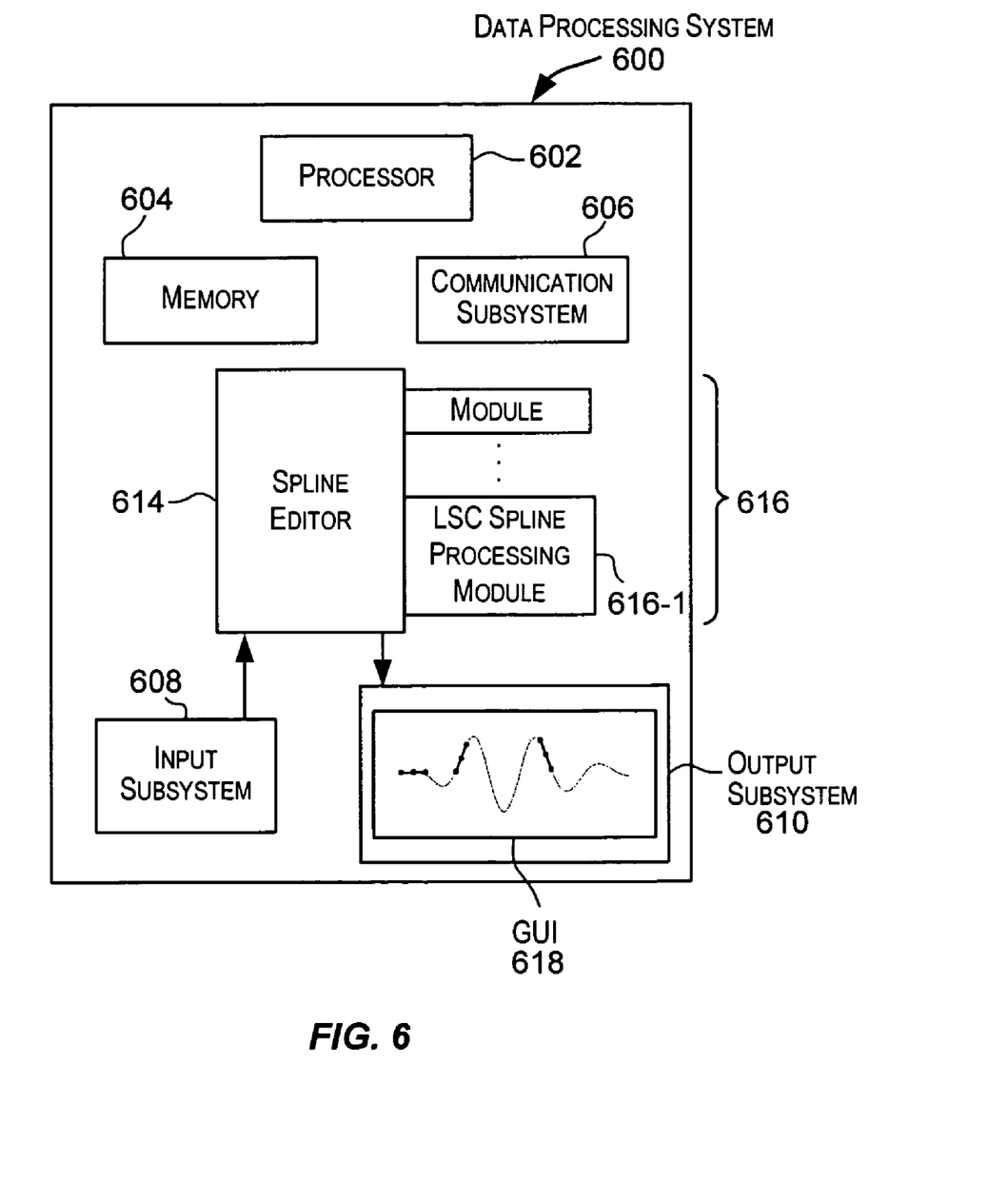
FIG. 6 is a simplified high level depiction of a data processing system that may be used to practice an embodiment of the present invention.

FIG. 6 is a simplified high level depiction of a data processing system 600 that may be used to practice an embodiment of the present invention. As depicted in FIG. 6, system 600 may comprise several components or subsystems including a processor or processing unit 602, a memory subsystem 604, a communication subsystem 606, an input subsystem 608, and an output subsystem 610. Processor 602 is configured to perform a substantial amount of the processing performed by data processing system 600. Processor 602 may communicate with the other subsystems using one or more bus subsystems. The various subsystems depicted in FIG. 6 may be implemented in software, or hardware, or combinations thereof. System 600 depicted in FIG. 6 is merely illustrative of an embodiment incorporating the present invention and does not limit the scope of the invention as recited in the claims. One of ordinary skill in the art would recognize other variations, modifications, and alternatives.

Communication subsystem 606 provides an interface to other computer systems, networks, and devices. For example, data processing system 600 may send and receive data from other systems, devices, or networks using communication subsystem 606.

Memory subsystem 604 may be configured to store the basic programming and data constructs that provide the functionality of data processing system 600. For example, software code modules or instructions that provide the functionality of the present invention may be stored in memory 604. These software modules or instructions may be executed by processor 602. Memory 604 may also provide a repository for storing various types of data used in accordance with the present invention. Memory subsystem 604 may include a number of memories including a main random access memory (RAM) for storage of instructions and data during program execution and a read only memory (ROM) in which fixed instructions are stored. Memory subsystem 604 may also include removable media such as an optical disk, a memory card, a memory cartridge, and other storage media.

Input subsystem 608 and output subsystem 610 enable a user to interact with data processing system 600. For example, a user may input information to system 600 using input subsystem 608. The information may be input via tools such as a mouse, a pointer, a keyboard, a touchscreen, a stylus, or other like input devices. System 600 may output information using output subsystem 610. Output subsystem 610 may include a screen or monitor, audio information output devices, or other devices capable of outputting information.

Animators generally use a spline editor (or animation editor) to specify and control animation for one or more objects. As depicted in FIG. 6, a spline editor (or animation editor) 614 may be executed by data processing system 600. An animator may specify the motion for an object being animated using spline editor 614. For example, the animator may specify a set of splines (or animation curves) which describe the way the object's parameters change over time. Spline editor 614 may use various objective functions and interpolation or approximation techniques to generate the splines. In one embodiment, spline editor 614 may provide a plug-in architecture wherein different modules 616 are provided for generating different types of splines. As depicted in FIG. 6, modules 616 include a module 616-1 that is configured to perform processing to generate LSC splines according to the teachings of the present invention. Module 616 is configured to minimize an objective function that is solvable by a set of linear equations. The linear equations that are used for providing the solution may be programmed into module 616-1. The solution to the set of linear equations may output values that approximate or interpolate a set of constraints or knots and are used are a basis for generating a LSC spline. The values may include real and complex or imaginary parts (for complex-valued splines).

An animator (or any user) may interact with spline editor 614 using input subsystem 608. For example, an animator may select the type of splines to be used using input subsystem 608. The animator may specify knot values (including interpolation constraints and tangential constraints) using a keyboard or a mouse of input subsystem 608. The animator may also manipulate knots using input subsystem 608. The animator may perform various other functions using input subsystem 608.

Information generated by spline editor 614 may be output to the animator using output subsystem 610. As depicted in FIG. 6, spline editor 614 may provide a graphical user interface (GUI) 618 that is displayed to the animator using output subsystem 610. For example, GUI 618 may be displayed on a display screen. The information output to the animator may include information related to various parameters associated with an object being animated. For example, for a parameter associated with the object, spline editor 614 may generate a set of values for the parameter over time according to the teachings of the present invention. The generated values may be displayed to the user. A LSC spline may be displayed to the user based upon the calculated values. In one embodiment, the X axis of the displayed spline represents time points and the Y axis represents the parameter values calculated for the various time points. For complex-valued splines, the value for a time point may comprise a real part and a complex part. Splines depicting the real parts and the complex parts may be displayed. Knots representing constraints specified by the animator may also be displayed. The LSC spline may approximate or interpolate the constraints. The animator may manipulate one or more of the knots, delete knots, or add new knots using input devices to change the animation.

Data processing system 600 can be of various types including a personal computer, a portable computer, a desktop, a workstation, a network computer, a mainframe, a kiosk, or any other data processing system. Due to the ever-changing nature of computers and networks, the description of computer system 600 depicted in FIG. 6 is intended only as a specific example for purposes of illustrating the preferred embodiment of the computer system. Many other configurations having more or fewer components than the system depicted in FIG. 6 are possible. For example, in a distributed environment, spline editor 614 may be executed on a server computer while the output may be displayed on another computer (e.g., the animator's client computer).

Figure 7:
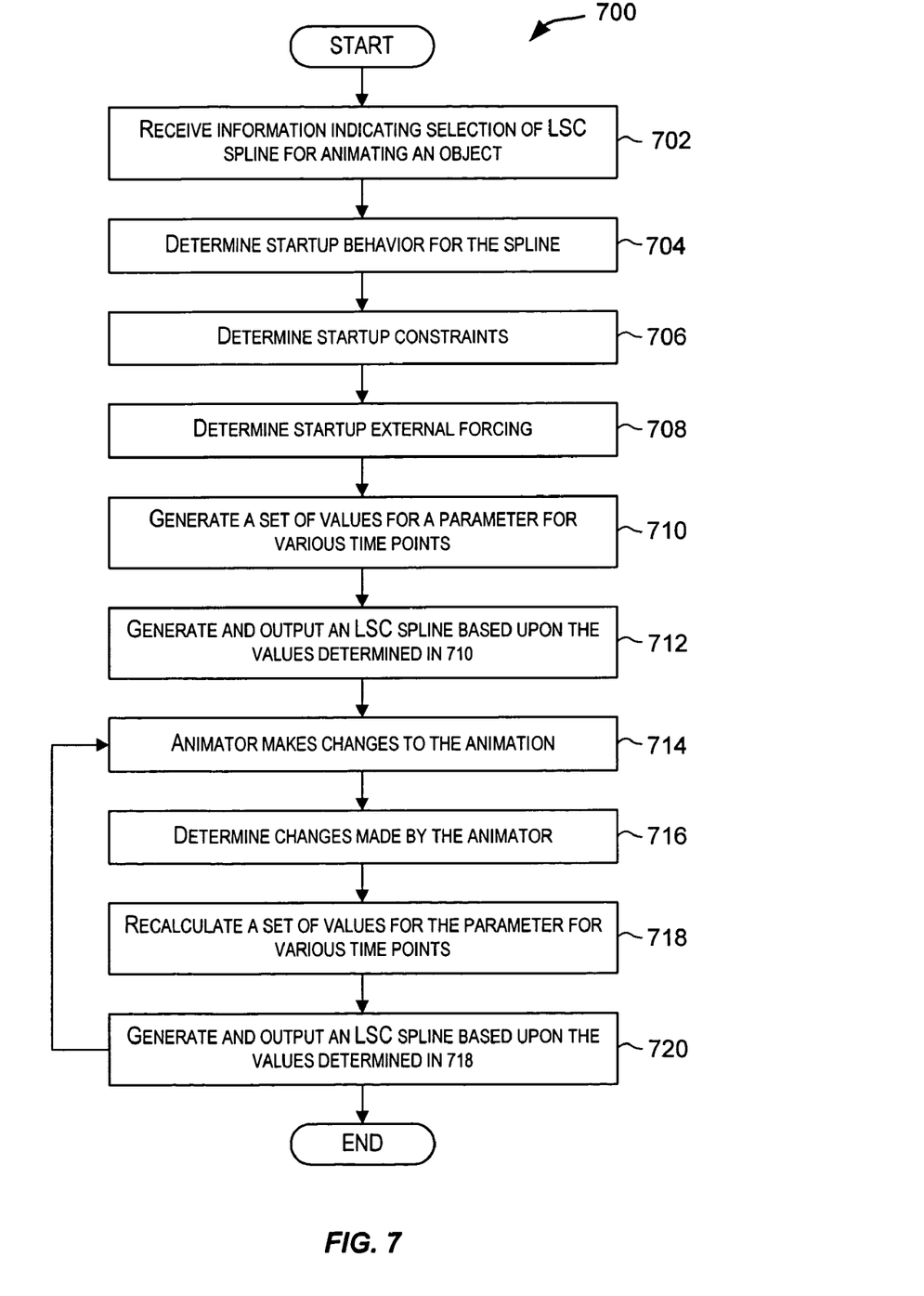
FIG. 7 depicts a simplified high-level flowchart showing processing that may be performed according to an embodiment of the present invention.

FIG. 7 depicts a simplified high-level flowchart showing processing that may be performed according to an embodiment of the present invention. The processing depicted in FIG. 7 or a portion thereof may be performed by a spline editor. The processing may be performed by software (code modules or instructions) executed by a processor, hardware modules, or combinations thereof. Flowchart 700 depicted in FIG. 7 is merely illustrative of an embodiment of the present invention and is not intended to limit the scope of the present invention. Other variations, modifications, and alternatives are also within the scope of the present invention. The method depicted in FIG. 7 may be adapted to work with different implementation constraints.

As depicted in FIG. 7, a spline editor may receive information indicating selection of a particular spline to be used for animating an object (step 702). For example, animator may indicate to the spline editor that an LSC spline is to be used for animating a parameter associated with an object. Selection of a LSC spline results in selection of a function to be used for approximating or interpolating a set of constraints where the optimized solution of the function is determinable using a set of linear equations. The function is one that approximates or interpolates the physics of the motion to be animated. According to the teachings of the present invention, the function is quadratic in terms of the unknowns to be solved for. The quadratic function may be minimized by taking a derivative of the function thereby yielding a set of linear equations to solve for various time points. Solution of the linear equations outputs a set of values for a parameter over various time points.

The spline editor may then determine the startup behavior for the spline (step 704). The term startup is used here to refer to the initial values determined for generating and displaying the LSC spline. The startup behavior characteristics may be specified by the animator. The startup behavior characteristics may also be determined from preset or default behavior characteristics configured for the spline selected in step 702. According to an embodiment of the present invention, step 704 may include determining the resonance frequency, the damping factor, and other behavioral characteristics of the spline. For example, for animating a bug antenna, characteristics such as the stiffness of the antenna, the actual resonance of the antenna, damping factor for the antenna, etc. may be pre-calculated and preset. These preset characteristics may be determined in step 704.

The spline editor may then determine the startup constraints or knots, if any, to be used for generating the LSC spline (step 706). These may be specified by the animator or may be determined from preset or default values. The constraints may include interpolation constraints and/or tangential constraints or other types of constraints.

The spline editor may then determine an external forcing, if any, to be used for the animation (step 708). The objective function associated with the LSC spline represents the internal function whose optimization is used to interpolate or approximate a set of constraints. Accordingly, if there is an external forcing then such needs to be specified. The external forcing may be specified by the animator or may be determined from preset or default values. For example, if a LSC spline is to be used to animate the motion of a "bobblehead" sitting on the dashboard of a car, then the motion of the car may specified as the external forcing since it affects the motion of the bobblehead.

A set of values for a parameter (sometimes also referred to as an animation variable or avar) associated with the object to be animated is then calculated for various time points based upon the behavior characteristics, constraints, and external forcing functions specified for the spline (step 710). The time points are those corresponding to the time period for the animation. For the initial generation of the LSC spline, the behavior characteristics, constraints, and external forcing functions that are used are those determined in steps 704, 706, and 708, respectively. As part of generating the values, the objective function that describes the motion is optimized over the constraints. For an LSC spline, the solution of the optimization is provided by solving a set of linear equations. Accordingly, in 710, the set of linear equations corresponding to the function being minimized are solved while taking into consideration the specified behavior characteristics, constraints, and external forcing functions. The solution yields values for the parameter over time that either approximate or interpolate the constraints. The values determined in 710 may be stored in a memory location accessible to the spline editor. For example, the values may be stored in memory 604 depicted in FIG. 6.

As previously described, LSC splines according to an embodiment of the present invention may be complex valued. This implies that a value calculated for a time point for a LSC spline comprises a real part and a non-zero complex or imaginary part. For complex-valued splines, both the real part and the complex part may be computed in step 710.

A LSC spline or animation curve may then be generated based upon the values determined in 710 and output to the animator (step 712). In one embodiment, outputting the spline includes plotting the value determined in 710 over a period of time. For example, time points may be displayed along the X axis and the values calculated for the time points may be displayed along the Y axis. The animation curve depicts the animation of the object parameter over a period of time. Constraints, behavior characteristics, and external forcing used for the calculation may also be displayed. For example, knots may be displayed along the animation curve identifying the interpolation and tangential constraints used for the calculation.

The animator may then make changes to the animation using the LSC spline (step 714). This may be done by making changes to animation criteria such as the behavior characteristics, constraints, or external forcing previously used to calculate the LSC spline. This may include changing the value of a criterion, deleting a criterion, or adding a new criterion. For example, using the displayed animation curve, the animator may change previously specified knots, add new knots, or delete previously specified knots. In one embodiment, the animation curve and the knots may be displayed to the animator via a GUI. The displayed knots may serve as control points enabling the animator to change their values, add knots, or delete knots via the GUI. In this manner, the LSC spline enables the animator to easily control and make changes to the animation.

The spline editor determines changes made by the animator (step 716). The values for the parameter associated with the object being animated are then recalculated for the various time points based upon the changed criteria (step 718). The values may be recalculated using a set of linear functions that provide a solution to the function being minimized. Accordingly, in 718, the set of linear equations are solved using to determine values for a set time points while taking into consideration the behavior characteristics, constraints, and external forcing functions presently specified for the spline. The recalculated values either approximate or interpolate the constraints. The values determined in 718 may be stored in a memory location accessible to the spline editor. For example, the values may be stored in memory 604 depicted in FIG. 6.

A LSC spline is then redrawn based upon the values recalculated in 718 (step 720). In this manner the LSC spline is recalculated and redrawn based upon the changes to animation made by the user. The redrawn LSC spline represents the changed animation. Processing may iterate through steps 716, 718, and 720, with the animator making changes to the animation, the values being recalculated, and the animation curve being redrawn per the new calculations. The iteration may be performed until the animator is satisfied with the animation. According to an embodiment of the present invention, the recalculation and redrawing of the LSC animation curve occurs in real time. For example, true interactive speeds of 30 fps update rates are achieved using a personal computer in one embodiment executing on a personal computer. In one embodiment, the LSC spline values computation takes less execution time than the time required for drawing the result. Accordingly, the LSC splines are calculated in real time and thus provide the interactivity and control desired by animators.

In the description provided above with respect to FIG. 7, LSC splines are used to animate a parameter (or avar) associated with an object being animated. In complex-valued spline embodiments, the values calculated for an avar may also be used to determine values for another parameter or avar. The complex or imaginary part associated with a value calculated for a parameter provides a phase angle. The existence of the phase angle allows a single animation curve for a parameter associated with an object being animated to control a collection of different animation parameters related by different phase lags.

For example, consider that the wagging oscillatory motion of a cat's tail is being animated. Consider the motion of two points on the tail, one near the base of the tail and one near the tip of the tail. The motion of the point near the base may go up and down and the tip of the tail may also move up and down in roughly the same oscillatory motion but with a phase offset. Animation for the point near the base may be animated using an LSC spline according to an embodiment of the present invention. A complex-valued spline may be generated encapsulating the motion of the tail point near the base. An animation curve representing the motion for the tail tip may then be obtained from the complex-valued spline generated for the base point by multiplying the spline of the base point with a magnitude of the phase that will shift the animation curve. A complex-valued spline or animation curve may be thus determined for the tail tip point based upon the complex-valued spline calculated for the base point.

As another example, consider a pair of hands connected to a body. The desired motion to be animated may be such that when the body oscillates, the hands also oscillate in a phase shifted manner. The motion for the body may be animated using a LSC spline. The animation curves for the hands may be then obtained from the animation curve for the body using the phase angle.

As described above with respect to FIG. 7, the startup criteria used for calculating values for generating a LSC spline may be specified by the animator or may be preset. According to an embodiment of the present invention, the criteria may be set based upon results or values generated from a simulation for the point. A simulation may be performed to animate the motion of an object, such as the motion of a character, where the animator wants each point on the character to wiggle (or oscillate) a different amount and in a different phase. The motion of a point on the character may be simulated and the results of the simulation such as the amplitude values, damping function, resonance value, etc. may be provided as input to an LSC spline calculation. The resultant LSC spline encapsulates the motion results from the simulation. The LSC spline may then be manipulated by the animator to change the animation for the point. For example, the animator may change constraints associated with the resultant LSC spline to change animation. Since the LSC spline encapsulates simulation results, editing or manipulating the LSC spline is tantamount to editing the simulation. In this manner, the LSC spline provides a convenient tool for manipulating and controlling simulation results to achieve the desired animation.

The simulation results may also be used to animate other points on the character which wiggle at possibly different amounts and phases from the initial point. For example, the simulation may be used to determine the amplitude and delays for other points on the character to be animated. The phase values obtained from the simulation for the various points may be provided as imaginary parts to the spline editor. A complex-valued LSC spline may be generated for the one point. The LSC spline obtained for one point may then be used to generate LSC splines for the other points. The phases calculated for the other points from the simulation and input to the spline editor as complex values may be multiplied with the LSC curve to obtain animation curves for the other points. In this manner, the results obtained from a simulation are used to generate animation curves for a plurality of different points whose motion is phase shifted.

The nature of the motion obtained from simulation may also be edited using a LSC spline generated based upon the simulation results. For example, assume that wiggly motion for a character has been simulated. Later on, the animator may feel that the character is not "squishy" enough. The squishiness of the character may be increased by scaling the imaginary part. In this manner, by manipulating the imaginary part, the animator can modify the resultant animation.

Embodiments of the present invention provide a better alternative to forward simulations. In forward simulation, one has to provide initial positions, the domain, initial forces, forces along the way, integrate accelerations over time to get velocities, and determine positions based upon the velocities. If the result at some point in time is not what is desired, it is usually very difficult to determine how forces and parameters before hand have to be changed to bring the motion closer to the goal. Instead, in embodiments of the present invention, values from a simulation may be used to calculate LSC splines which then enable an animator to directly move the result to what is desired and the solution to the spline defines a curve that minimizes the function required to cause the motion to follow the spline curve. The resultant animation provides the realism provided by simulation with the interactivity and control of splines. The resultant LSC splines thus enable an animator to edit a simulation.

As described above, LSC splines provide several features that are attractive to animators. They generalize traditional splines while adding an inherent ability to produce common animation phenomena like overshoot due to follow through, passive damping, and motion which is fundamentally oscillatory. Further, they break the time symmetry of traditional splines, incorporating damping. They accurately characterize real physical systems near equilibrium. As described above, they can be computed in constant time per frame with banded linear systems. They can be chosen to have unconditional stability.

A large part of achieving a high degree of realism in character animation is getting the secondary motion to look right. Oscillatory phenomenon is a dominant form of secondary motion. Examples of oscillatory motions include a fish wiggling, an antenna vibrating, skin wiggling, and the like. Previously, in order to animate harmonic or oscillatory motion (e.g., motion for things that wiggle) using traditional splines, the animator had to specify a large number of knots, one for each wiggle or inflexion point. This made the animation process complex and time consuming. Such oscillatory phenomena may be more easily animated using LSC splines. The objective function that is minimized for calculation of an LSC spline may be based upon the physical model of a damped spring. This function is quadratic and the solution to the optimization may be determined by solving a set of linear equations. The set of linear equations thus defines the motion of the object being animated. Solution of the linear equations provides a more realistic and physically accurate rendering of the oscillatory motion of an object. The motion may be animated using a lesser number of knots, thereby reducing the burden on the animator for producing the animation.

Embodiments of the present invention provide solutions for linear mechanisms. While, nonlinear mechanisms will certainly play an important role in animation, nonetheless, nonlinear optimizations are fraught with peril from the point of view of real-world use by animators. For the most part, animators expect that continuous changes to their inputs will produce similarly continuous changes in their results. This is nearly impossible to ensure with nonlinear optimizations, but almost guaranteed by linear systems. As a consequence, LSC splines provide powerful animation tools in the hands of animators, particularly given that they completely generalize familiar piecewise cubics. The full interactive processing speed provided by LSC splines is one of the keys to their value as animation tools. Animators demand true real-time control, and embodiments of the present invention provide interactive feedback desired from a powerful and effective animation tool.

The teachings of the present invention may also be used in the context of nonlinear Spacetime Constraints optimization, since many of these methods rely on solving a series of linearized problems. By generalizing traditional splines, by adding a degree of additional physical reality into key-frame animation and by pointing out the opportunities for true real-time optimization in the inner loop of the animation process, LSC splines provide a powerful animation tool.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

REFERENCES

The following references are herein incorporated by reference in their entirety for all purposes.

[Bartels 1987] Richard Bartels, John Beatty and Brian Barsky, *An Introduction to Splines for Use in Computer Graphics and Geometric Modeling*, Morgan Kaufmann, 1987.

[Cohen 1992] Michael Cohen, "Interactive spacetime control for animation," SIGGRAPH 1992, pp. 293-302.

[Fang 2003] Anthony Fang and Nancy Pollard, "Efficient Synthesis of Physically Valid Human Motion," SIGGRAPH 2003, pp. 417-426.

[Godunov 1987] S. Godunov and V. Ryabenkii, *Difference Schemes: An Introduction to the Underlying Theory*, Elsevier, 1987

[Golub 1983] Gene Golub and Charles Van Loan, *Matrix Computations*, Johns Hopkins University Press, 1983.

[Goldstein 1980] Herbert Goldstein, *Classical Mechanics, Second Edition*, Addison Wesley, 1980

[Gleicher 1997] Michael Gleicher, "Motion Editing with Spacetime Constraint" in *Proceedings of the 1997 Symposium on Interactive 3D Graphics*, pp 139-148.

[Lasseter 1987] John Lasseter, "Principles of Traditional Animation Applied to 3D Computer Animation," SIGGRAPH 1987, pp. 35-44.

[Liu 1994] Z. Liu, S. Gortler, and Michael Cohen, "Hierarchical Spacetime Control," SIGGRAPH 1994, pp. 35-42.

[McMahon 1984] Thomas McMahon, *Muscles, Reflexes, and Locomotion*, Princeton University Press, 1984.

[Ngo 1993] Tom Ngo and Joe Marks, "Spacetime Constraints Revisited," SIGGRAPH 1993, pp. 343-350

[Oppenheim 1975] Alan Oppenheim and Ronald Schafer, *Digital Signal Processing*, Prentice Hall, 1975.

[Popovic 1999] Zoran Popovic and Andrew Witkin, "Physically Based Motion Transformation," SIGGRAPH 1999, pp. 11-20.

[Popovic 2000] Jovan Popovic, Steven Seitz, Michael Erdmann, Zoran Popovic and Andrew Witkin, "Interactive Manipulation of Rigid Body Simulations," SIGGRAPH 2000, pp. 209-218.

[Press 1986] William Press, Brian Flannery, Saul Teukolsky and William Vetterling, *Numerical Recipes: The Art of Scientific Computing*, Cambridge University Press, 1986.

[Rose 1996] Charles Rose, Brian Guenter, Bobby Bodenheimer and Michael F. Cohen, "Efficient generation of motion transitions using spacetime constraints," SIGGRAPH 1996, pp. 147-154.

[Treuille 2003] Adrien Treuille, Antoine McNamara, Zoran Popovic and Jos Stam, "Keyframe Control of Smoke Simulations," SIGGRAPH 2003, pp. 716-723.

[Safonova 2004] Alla Safonova, Jessica Hodgins and Nancy Pollard, "Synthesizing Physically Realistic Human Motion in Low-Dimensional, Behavior-Specific Spaces", SIGGRAPH 2004 pp. 514-521.

[Witkin 1988] Andrew Witkin and Michael Kass, "Spacetime Constraints," SIGGRAPH 1988, pp. 159-168.

[Witkin 1995] Andrew Witkin and Zoran Popovic, "Motion Warping," SIGGRAPH 1995 pp. 105-108.

What is claimed is:

1. In a computer-implemented animation system, a method for animating an object, the method comprising:
   generating an animation curve for a first parameter associated with the object, the animation curve generated based upon a set of values calculated for the first parameter over time, the set of values comprising a first value having a real part and a non-zero imaginary part wherein the non-zero imaginary part indicates a phase value;
   generating an animation curve for a second parameter associated with the object using the animation curve generated for the first parameter and the non-zero imaginary part, wherein motion of the second parameter is phase-shifted from motion of the first parameter; and
   controlling animation of the first parameter using the animation curve.

2. The method of claim 1 wherein the non-zero imaginary part identifies a phase angle.

3. The method of claim 1 wherein the phase value is determined in response to a simulation model associated with the object.

4. The method of claim 1 wherein:
   the animation curve for the second parameter is phase-shifted from the animation curve for the first parameter by the phase value.

5. The method of claim 1 wherein:
   the animation curve for the first parameter comprises a spacetime constraint spline.

6. The method of claim 1 wherein generating the animation curve for the first parameter comprises:
   determining a set values for the first parameter over a plurality of time points using a set of linear equations, the set of linear equations providing a solution to a function specifying motion.

7. The method of claim 6 wherein the function represents oscillatory motion.

8. The method of claim 6 wherein the function models a mass-spring oscillator.

9. The method of claim 1 further comprising:
   receiving information identifying a set of behavior characteristics;
   receiving information identifying a set of constraints; and
   wherein generating the animation curve for the first parameter comprises generating an animation curve that approximates or interpolates the set of constraints and is based upon the set of behavior characteristics.

10. The method of claim 9 wherein:
    the set of constraints comprises an interpolation constraint and a tangent constraint; and
    the set of behavior characteristics comprises a damping factor and a resonance value.

11. The method of claim 9 further comprising:
    displaying the animation curve for the first parameter; and
    displaying a representation of the set of constraints.

12. The method of claim 11 further comprising:
    receiving information indicating a change in at least one constraint in the set of constraints; and
    generating an animation curve for the first parameter that interpolates or approximates the changed set of constraints.

13. The method of claim 12 wherein generating the animation curve that interpolates or approximates the changed set of constraints is performed at an interactive rate of 30 frames per second or less.

14. A computer program product comprising a memory encoding computer system executable code, wherein the computer system includes a processor and the memory, the computer system executable code comprising:
    code configured to direct the processor to determine an animation curve associated with a first parameter associated with an object in response to a set of values calculated for the first parameter over time, the set of values comprising a first value having a real part and a non-zero imaginary part wherein the non-zero imaginary part indicates a phase value;
    code configured to direct the processor to generating an animation curve associated with a second parameter associated with the object in response to the animation curve generated for the first parameter and the non-zero imaginary part, wherein a motion of the second parameter is phase-shifted with respect to motion of the first parameter; and
    code configured to direct the processor to modify a value of the first parameter associated with the object in response to the animation curve for the first parameter.

15. The computer program product of claim 14 wherein the non-zero imaginary part indicates a phase angle.

16. The computer program product of claim 14 further comprising code configured to direct the processor to determine the phase value in response to a simulation model.

17. The computer program product of claim 14 wherein the animation curve for the second parameter is phase-shifted with respect to the animation curve for the first parameter by the phase value.

18. The computer program product of claim 14 wherein the animation curve associated with the first parameter comprises a spacetime constraint spline.

19. The computer program product of claim 14 further comprising code configured to direct the processor to determine a set values for the first parameter over a plurality of time points in response to a set of linear equations, wherein the set of linear equations provide a solution to a function specifying motion.

20. The computer program product of claim 19 wherein the function specifying motion comprises an oscillatory motion.

21. The computer program product of claim 19 wherein the function models a mass-spring oscillator.

22. The computer program product of claim 14 further comprising:
code configured to direct the processor to receive information identifying a set of behavior characteristics;
code configured to direct the processor to receive information identifying a set of constraints; and
code configured to direct the processor to generate an animation curve that approximates or interpolates the set of constraints in response to the set of behavior characteristics.

23. The computer program product of claim 14
wherein the set of constraints comprises an interpolation constraint and a tangent constraint; and
wherein the set of behavior characteristics comprises a damping factor and a resonance value.

24. The computer program product of claim 14 further comprising:
code configured to direct the processor to output the animation curve for the first parameter on a display; and
code configured to direct the processor to output a representation of the set of constraints on the display.

25. The computer program product of claim 24 further comprising:
code configured to direct the processor to receive information indicating a change in at least one constraint in the set of constraints; and
code configured to direct the processor to generate an animation curve associated with the first parameter that interpolates or approximates the change in the one constraint.

26. The computer program product of claim 25 wherein code configured to direct the processor to generate the animation curve associated with the first parameter is performed at an interactive rate of 30 frames per second or less.

27. A computer system for animation comprising:
a memory configured to store of values specified for a first parameter associated with an object with respect to time, wherein the set of values comprise a first value having a real part and a non-zero imaginary part wherein the non-zero imaginary part indicates a phase value; and
a processor coupled to the memory, wherein the processor is configured to determine an animation curve associated with the first parameter associated with the object in response to the set of values calculated for the first parameter over time, wherein the processor is configured to determine an animation curve associated with a second parameter associated with the object in response to the animation curve determined for the first parameter and the non-zero imaginary part, wherein a motion of the second parameter is phase-shifted with respect to motion of the first parameter, and wherein the processor is configured to modify a value of the first parameter associated with the object in response to the animation curve for the first parameter.

28. The computer system of claim 27 wherein the non-zero imaginary part indicates a phase angle.

29. The computer system of claim 27 wherein the processor is also configured to determine the phase value in response to a simulation model.

30. The computer system of claim 27 wherein the animation curve for the second parameter is phase-shifted with respect to the animation curve for the first parameter by the phase value.

31. The computer system of claim 27 wherein the animation curve associated with the first parameter comprises a spacetime constraint spline.

32. The computer system of claim 27 wherein the processor is also configured to determine a set values for the first parameter over a plurality of time points in response to a set of linear equations, wherein the set of linear equations provide a solution to a function specifying motion.

33. The computer system of claim 32 wherein the function specifying motion comprises an oscillatory motion.

34. The computer system of claim 32 wherein the function models a mass-spring oscillator.

35. The computer system of claim 27
wherein the processor is configured to receive information identifying a set of behavior characteristics;
wherein the processor is configured to processor to receive information identifying a set of constraints; and
wherein the processor is configured to generate an animation curve that approximates or interpolates the set of constraints in response to the set of behavior characteristics.

36. The computer system of claim 27
wherein the set of constraints comprises an interpolation constraint and a tangent constraint; and
wherein the set of behavior characteristics comprises a damping factor and a resonance value.

37. The computer system of claim 27
wherein the processor is configured to output the animation curve for the first parameter on a display; and
wherein the processor is configured to output a representation of the set of constraints on the display.

38. The computer system of claim 37
wherein the processor is configure to receive information indicating a change in at least one constraint in the set of constraints; and
wherein the processor is configured to generate an animation curve associated with the first parameter that interpolates or approximates the change in the one constraint.

39. The computer system of claim 38 wherein the processor is configured to generate the animation curve associated with the first parameter at an interactive rate of 30 frames per second or less.

* * * * *